April 9, 1935. M. B. REACH 1,996,880
METHOD OF MAKING GOLF BALLS
Filed March 15, 1933

Inventor:
Milton B. Reach,
By Spear, Donaldson & Hall
Attorneys.

Patented Apr. 9, 1935

1,996,880

UNITED STATES PATENT OFFICE 1,996,880

METHOD OF MAKING GOLF BALLS

Milton B. Reach, Springfield, Mass., assignor to A. G. Spalding & Bros., New York, N. Y., a corporation of New Jersey Application March 15, 1933, Serial No. 660,910

5 Claims. (Cl. 154—17)

The invention concerns the process of making a golf ball involving expanding the so called center comprising the rubber windings, one object being to produce balls of uniform size and of uniform marking. The invention also consists in the ball produced by the improved process.

Figure 1:
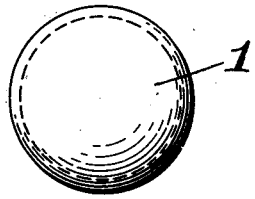
Fig. 1 is a view of the hollow rubber ball forming the core and filled with suitable material in fluid form.
Figure 2:
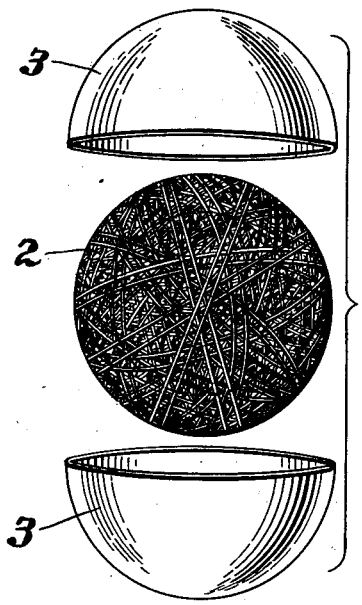
Fig. 2 shows the center formed by wrapping a rubber thread under tension on the core. This view also shows the hemispherical rubber shells which are placed on the center and then molded together at their edges.
Figure 4:
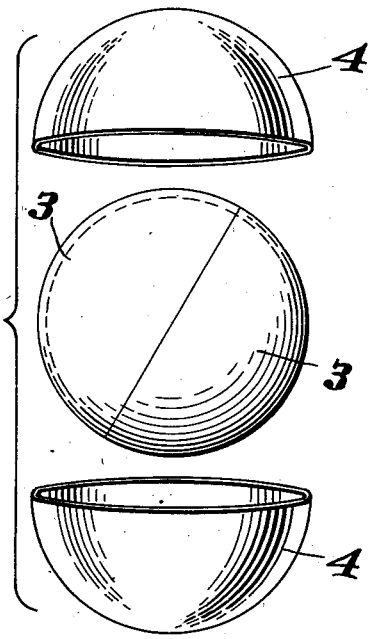
Fig. 4 shows the rubber cover members in hemispherical form which are applied to the partly completed ball of Fig. 3 after the injection has been accomplished.
Figure 3:
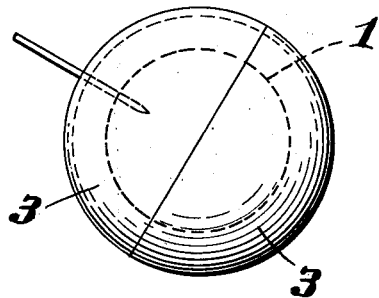
Fig. 3 shows the ball with the shells of Fig. 2 applied and it indicates the hypodermic needle.

I use a ball core 1, consisting of a small hollow ball of rubber filled with a liquid, such as water, glue, and a mineral powder to give weight, this powder being held in suspension. This core is frozen and when hard is wound with a rubber thread 2 to the required size, and this becomes the golf ball center. I then take two thin balata hemispheres 3 of smooth form, both inside and out, fit these to the center, place the assembly in a mold, and apply heat to cause the hemispherical shells to flow and unite at their edges. This molded center is then cooled. After having allowed sufficient time for the center to set, I inject a fluid, preferably water, by means of a needle thrust through the shell, rubber windings, and into the center of the rubber core, increasing the pressure therein to certain prescribed limits. The needle is withdrawn and the pressure on the rubber threads tends to seal the small hole made by the inthrust of the needle. At this stage I apply over the thin balata shell a pair of thin cover members 4 of hemispherical form; or, as preferred, this final cover may be applied by a dipping process in balata cement and built up to required size. Thereafter the whole assembly is placed in a final mold and sufficient heat applied to impress the markings in the surface of the ball and thoroughly unite the cover members together and to the inner shell, or the cover coating to said shell, as the case may be.

This final molding operation is of short duration and at a relatively low heat so that the tension built up on the inside of the ball is not materially impaired.

Variations in the size of the center and its protecting or enclosing shell are taken care of in the flow of the external cover when molded, excess stock flowing out in a flash line which is afterwards trimmed off. Through this process the degree of variation in the size of the centers with their enclosing shells is compensated for or equalized by a pro rata increase or decrease in the thickness of the cover 4, as established in the last molding operation.

By this process the perforation made by the needle is closed by the cover 4 and no appearance of a puncture occurs at the finished surface of the ball.

The second molding operation, involving the uniting of the cover members 4, may be of considerably less duration than the first molding operation, by which the inner shells 3 are united, and while these molding operations may vary as to duration, one example would be about 15 minutes for the first molding operation and about 4 minutes for the final molding operation. In the final molding the cover members 4 not only unite with each other but will unite with the shell composed of the united members 3.

From the above it will be noticed that I expand the center at an intermediate stage of the manufacture by injecting the pressure through the shell made up of the united hemispherical sections 3, 3. At this stage the ball has not been given either its final size or its markings, but these characteristics are given in the subsequent and final step of manufacture, i. e., in molding the cover portion, and thus the balls are completed of a uniform size and with uniform markings.

It is of advantage to apply the pressure to the interior of the center after this has had its protective shell molded thereon, because if the center were expanded and thereafter the protective shell were molded thereon, the heat of the molding operation would affect the rubber windings and cause them to let down in tension.

In my process the application of the expanding pressure takes place after the first molding operation. The final molding action of the cover portion, requiring, as it does, a much shorter time than the first operation, and the protective shell already having been applied and the expanding effected thereafter, the rubber windings will be substantially unaffected by the heat of the final molding.

The effect of the heat of the final molding on the rubber will be substantially nil, because of the quick flowing character of the cover material, resulting in a short time duration of the molding operation, as well as the protection to the rubber winding afforded by the inner shell or enclosure, the heat not having time to penetrate the shell to the rubber windings.

The cover members 4 may be of balata.

I claim:

1. The steps in the method of making golf balls consisting in applying under heat a layer of expansible material about the rubber windings of the center, injecting pressure fluid through said layer into the center to expand the center and said layer to substantially the prescribed size, and then molding under heat a cover portion about the said layer, substantially as described.

2. A process according to claim 1 consisting in molding the said protective layer of two preformed hemispherical shells.

3. A process according to claim 1 consisting in molding the said protective layer of two preformed hemispherical shells, and molding the cover from two preformed hemispherical shells.

4. The steps in the method of making golf balls, consisting in applying under heat a layer of expansible material about the rubber windings of the center, allowing the ball to cool, injecting pressure fluid through said layer into the center to expand the same, together with the layer of expansible material thereon, and then molding under heat a final cover portion about the said layer, the markings being impressed upon said final cover by said second molding operation, substantially as described.

5. The steps in the method of making golf balls consisting in applying under heat a layer of expansible material about the rubber windings of the center, injecting pressure fluid through said layer into the center to expand the center and said layer, and then molding, under a relatively low degree of heat, a cover portion about the said layer, substantially as described.

MILTON B. REACH.